(12) United States Patent
Booth et al.

(10) Patent No.: US 9,407,123 B2
(45) Date of Patent: Aug. 2, 2016

(54) GENERATOR WITH SUPPORT STRUCTURE

(75) Inventors: James Kenneth Booth, Brande (DK);
Uffe Eriksen, Horsens (DK); Jacob Blach Nielsen, Engesvang (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 463 days.

(21) Appl. No.: 13/615,716

(22) Filed: Sep. 14, 2012

(65) Prior Publication Data
US 2013/0241365 A1 Sep. 19, 2013

(30) Foreign Application Priority Data
Oct. 4, 2011 (EP) ..................................... 11183806

(51) Int. Cl.
*H02K 5/15* (2006.01)
*H02K 1/18* (2006.01)
*H02K 1/28* (2006.01)
*F03D 1/00* (2006.01)
*H02K 5/22* (2006.01)
*H02K 7/18* (2006.01)
*H02K 1/27* (2006.01)
*H02K 7/08* (2006.01)

(52) U.S. Cl.
CPC ...... *H02K 5/22* (2013.01); *F03D 1/003* (2013.01); *H02K 1/187* (2013.01); *H02K 1/28* (2013.01); *H02K 5/15* (2013.01); *H02K 7/1838* (2013.01); *H02K 1/2786* (2013.01); *H02K 7/085* (2013.01); *Y02E 10/725* (2013.01)

(58) Field of Classification Search
CPC .................................. H02K 5/04; H02K 5/15
USPC .................. 310/67 R, 61, 60 A, 156.26, 424, 310/400–417; 290/44, 55
See application file for complete search history.

(56) References Cited

U.S. PATENT DOCUMENTS

| 7,642,668 | B2 * | 1/2010 | Kim et al. ....................... 290/55 |
| 2007/0103027 | A1 | 5/2007 | Bagepalli |
| 2008/0315697 | A1 * | 12/2008 | Bonnet ........................... 310/83 |
| 2009/0015020 | A1 * | 1/2009 | Stiesdal .......................... 290/55 |
| 2009/0134630 | A1 * | 5/2009 | Stiesdal .......................... 290/55 |
| 2010/0264664 | A1 * | 10/2010 | Lauke ............................. 290/55 |
| 2011/0001320 | A1 * | 1/2011 | Lagerweij et al. .............. 290/55 |
| 2011/0309627 | A1 * | 12/2011 | Sonajalg et al. ................ 290/55 |

FOREIGN PATENT DOCUMENTS

| DE | 4402184 | A1 | 8/1995 |
| EP | 1612415 | A2 | 1/2006 |
| EP | 2014917 | A1 | 1/2009 |
| WO | WO 2010010544 | A2 * | 1/2010 .............. F03D 11/00 |

* cited by examiner

Primary Examiner — Thomas Truong

(57) ABSTRACT

A generator, particularly for a wind turbine, having a rotor and a stator is provided. The rotor includes at least one disc-like shaped rotor end plate supporting the rotor and the stator includes at least one disc-like shaped stator end plate supporting the stator, wherein the at least one rotor end plate and/or the at least one stator end plate at least partially extends tilted relative to the center axis of the generator.

12 Claims, 6 Drawing Sheets

GENERATOR WITH SUPPORT STRUCTURE

CROSS REFERENCE TO RELATED APPLICATIONS

This application claims priority of European Patent Office application No. 11183806.6 EP filed Oct. 4, 2011. All of the applications are incorporated by reference herein in their entirety.

FIELD OF INVENTION

A generator, particularly for a wind turbine, having a rotor and a stator, is provided. The rotor comprises at least one disc-like shaped rotor end plate supporting the rotor and the stator comprises at least one disc-like shaped stator end plate supporting the stator.

BACKGROUND OF INVENTION

Generators such as used in wind turbines have to withstand high mechanical loads during operation. Particularly, large-scaled generators have to encounter huge axial and/or radial forces during operation, which forces are challenging for the generator support structure, i.e. respective support structures of the rotor and/or the stator in the shape of respective rotor end plates and/or stator end plates. Thereby, a concrete problem is the maintenance of a constant air-gap between the rotor and the stator.

Hence, the support structure of the generator, i.e. particularly respective essentially radially extending rotor end plates and/or stator end plates, must be sufficiently stable so as to withstand structural loads or vibrations. Particularly, a collision of the rotor and the stator which would lead to considerable damage of the generator as a whole has to be avoided.

The known approaches of support structures of modern, particularly large-scaled, generators are oftentimes not satisfying regarding their mechanical stability.

SUMMARY OF INVENTION

It is an object to provide a generator with improved mechanical stability.

This is achieved by a generator as initially described, wherein the at least one rotor end plate and/or the at least one stator end plate at least partially extends tilted relative to the centre axis of the generator.

The provided generator has an at least partially tilted, inclined, or conical rotor end plate and/or stator end plate leading to improved mechanical stability of the respective rotor and/or stator support structure. Particularly, the respective rotor and/or stator support structure is provided with additional mechanical stability against mechanical loads in the direction of the horizontally extending centre axis of the generator. As far as the inventive generator is part of a wind turbine, the centre of mass may be located closer to the tower construction of the wind turbine leading to improvements in the statics of the entire wind turbine construction. Further, the axial dimensions of a stator shaft supporting the stator may be reduced as well.

The term "tilted" means that a respective rotor end plate and/or stator end plate or a respective section of a rotor end plate and/or stator end plate extends with a certain angle relative to the centre axis of the generator. The respective rotor end plates and/or stator end plates are tilted off the axial face side of the rotor and/or stator in an outward direction emanating from the centre axis of the generator.

Exemplary tilting angles of respective rotor end plates and/or stator end plates or respective sections of rotor end plates and/or stator end plates lie in the range of 1-70°, particularly 15-65°, in anti-clockwise or clockwise direction emanating from a vertical axis perpendicularly extending relative to the centre axis of the generator. Of course, exceptions or deviations from the named tilting angles are possible.

As far as the inventive generator comprises more than one rotor end plate and/or stator end plate, the respective tilting angles may be equal or different. The same applies to the case, in which the inventive generator comprises at least one at least partially tilted rotor end plate and at least one at least partially tilted stator end plate.

If the rotor end plate and/or the stator end plate only partially extends tilted relative to the centre axis of the generator, the respective rotor end plate and/or stator end plate comprises at least one first section perpendicularly extending relative to the centre axis of the generator and at least one second section extending tilted relative to the centre axis of the generator. It is possible that a respective rotor end plate and/or stator end plate comprises more than one respective first section and/or more than one respective second section. Usually, first sections are followed by second sections, and vice versa.

Generally, the inventive design of respective rotor end plates and/or stator end plates allows constructing generators with a large depth while maintaining the stator shaft supporting the stator, i.e. the respective stator end plates, comparatively short in axial direction. In such a manner, comparatively low-weight generator constructions with large axial dimensions in the region of the stator coils (stator windings) and rotor permanent magnets are feasible.

According to an exemplary embodiment, the stator comprises at least one stator end plate disposed at each axial face side of the stator, whereby respective stator end plates at least partially extend tilted relative to the centre axis of the generator only at one axial face side of the stator, or respective stator end plates at least partially extend tilted relative to the centre axis of the generator at both axial face sides of the stator. Thus, the stator may be supported by at least two respective stator end plates, i.e. at least one respective stator end plate is disposed at each face side of the stator. Thereby, respective stator end plates at least partially extend tilted relative to the centre axis of the generator at only one or both axial face sides of the stator. In the latter case, it is possible to further reduce the axial dimensions of the stator shaft.

Likewise, it is possible that the rotor comprises at least one rotor end plate disposed at each axial face side of the rotor, whereby respective rotor end plates at least partially extend tilted relative to the centre axis of the generator only at one axial face side of the rotor, or respective rotor end plates at least partially extend tilted relative to the centre axis of the generator at both axial face sides of the rotor. Thus, the rotor may be supported by at least two respective rotor end plates, i.e. at least one respective rotor end plate is disposed at each face side of the rotor. Thereby, respective rotor end plates at least partially extend tilted relative to the centre axis of the generator at only one or both axial face sides of the rotor.

As far as the generator is part of a wind turbine, the axial positions of respective bearing means supporting respective rotor end plates may be axially moved towards the tower construction of the wind turbine leading to the mentioned possibility of reducing the axial dimensions of the stator shaft usually supporting the stationary part of respective bearing means.

It is thinkable that the rotor comprises two axially adjacently disposed rotor end plates at least partially extending tilted relative to the centre axis of the generator, whereby the rotor end plates are disposed at one axial face side of the rotor. In such a manner, the rotor is supported by two respective rotor end plates at one common face side of the rotor. Thereby, the rotor support structure may be further provided with improved mechanical stability. Of course, it is also possible that the rotor is provided with at least two respective rotor end plates at both face sides of the rotor.

Likewise, it is possible that the stator comprises two axially adjacently disposed stator end plates at least partially extending tilted relative to the centre axis of the generator, whereby the stator end plates are disposed at one axial face side of the stator. In such a manner, the stator is supported by two respective stator end plates at one common face side of the stator. Thereby, the stator support structure is further provided with improved mechanical stability. Of course, it is also possible that the stator is provided with at least two respective stator end plates at both face sides of the stator.

Thereby, the radially outer ends of the respective rotor end plates may converge in a common point at the axial face side of the rotor. Additionally or alternatively, the radially outer ends of the respective stator end plates may converge in a common point at the axial face side of the stator. Thus, the two respective rotor end plates and/or stator end plates being disposed at a common face side of the rotor or stator respectively do not extend in parallel, but converge in radial outward direction. That is, the respective rotor end plates and/or stator end plates comprise different tilting angles with respect to a vertical axis or the centre axis of the generator, respectively.

As far as the respective rotor end plates and/or stator end plates disposed at a common face side of the rotor and/or stator extend in parallel or extend essentially parallel, i.e. do not converge in a common point at the face side of the rotor and/or stator, the tilting angles of respective rotor end plates and/or stator end plates are equal with respect to a vertical axis or the centre axis of the generator, respectively.

It is further possible that, if both at least one rotor end plate and at least one stator end plate at least partially extend tilted relative to the centre axis of the generator, the respective rotor and stator end plates are disposed at the same or opposite axial face sides of the generator. Thereby, it is preferred that respective rotor end plates and stator end plates are disposed at the same axial face side of the generator, i.e. the rotor and the stator, respectively. The tilting angles of the respective rotor end plate(s) and stator end plate(s) may be equal or different.

According to a further embodiment of the inventive generator, at least one stator end plate comprises at least one aperture. As a rule, the term "aperture" refers to openings, through holes or the like. In such a manner, accessibility to the inside of the generator, particularly into the axial ring-space between the rotor and the stator is possible which may be necessary for maintenance and/or service works of respective components of the generator such as bearing means or the like. Additionally, respective apertures may serve as venting holes, i.e. allow the circulation of a gaseous cooling medium within the generator.

A wind turbine, particularly a direct drive wind turbine, comprises at least one generator as described before. The generator is arranged within the wind turbine, i.e. a respective nacelle of the wind turbine for instance, in such a manner that one face side of the generator is oriented to the drive-end of the wind turbine corresponding to the side of the rotor hub and one face side of the generator is oriented to the non-drive end of the wind turbine corresponding to the side of the tower construction of the wind turbine.

BRIEF DESCRIPTION OF THE DRAWINGS

Reference is made to the following figures, whereby.

DETAILED DESCRIPTION OF INVENTION

Figure 1:
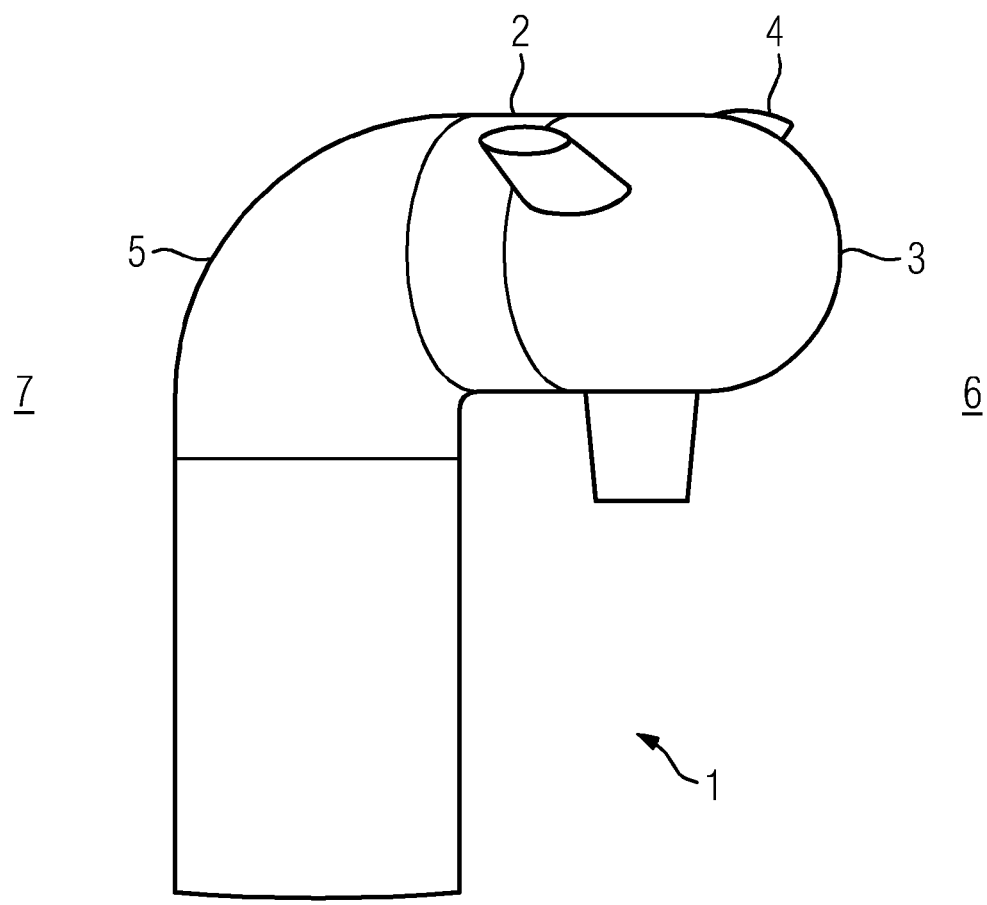
FIG. 1 shows a principle partial view of a wind turbine.

FIG. 1 shows a principle partial view of a wind turbine 1. The wind turbine 1 may be applicable for offshore applications. The wind turbine 1 is a direct drive wind turbine 1, i.e. the generator 2 of the wind turbine 1 is directly connected to the rotor hub 3 having respective rotor blades 4 attached thereto. Thus, the generator 2 is disposed between a structural component 5 of the wind turbine construction and the rotor hub 3. The structural component 5 may be a so called bedframe or the like. Hence, the generator 2 has one face side oriented towards the drive end 6, i.e. the side of the rotor hub 3 of the wind turbine 1, and one face side oriented towards the non-drive end 7 of the wind turbine construction, i.e. the side of the structural component 5 of the wind turbine construction.

Figure 2:
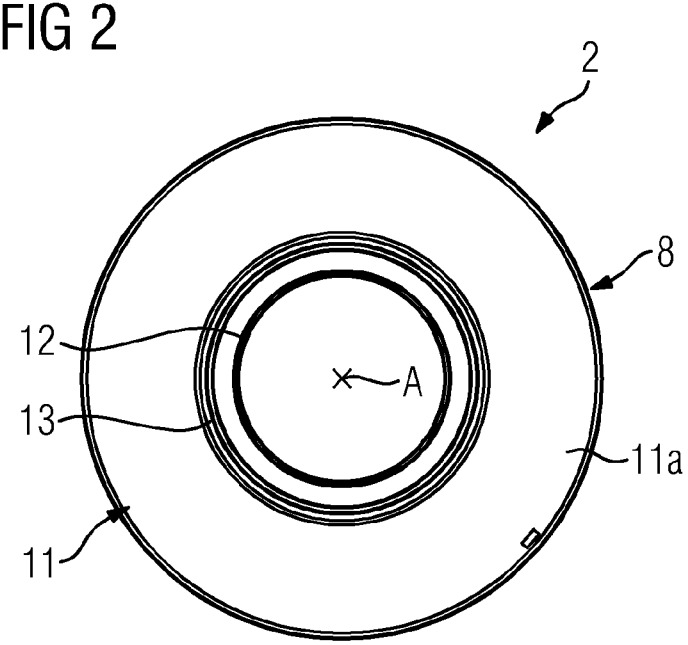
FIG. 2 shows an axial view at the front side of a genera for according to an exemplary embodiment.
Figure 3:
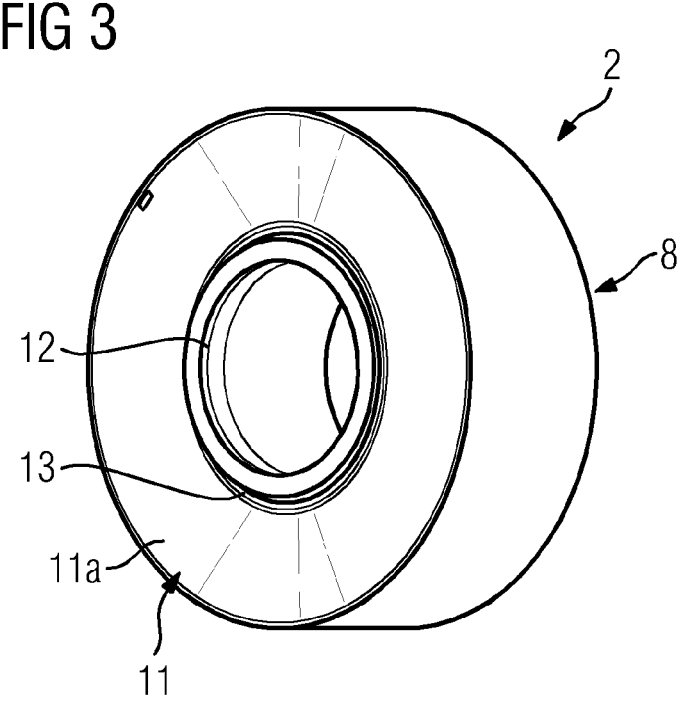
FIG. 3 shows a perspective view of the generator of FIG. 2.

FIG. 2 shows an axial view at the front side of a generator 2 according to an exemplary embodiment. The front side of the generator 2 refers to the face side of the generator 2 which is oriented towards the drive end 6 of the wind turbine 1 (cf. FIG. 1). FIG. 3 shows a perspective view of the generator 2 of FIG. 2.

The generator 2 comprises a ring-like shaped rotor 8 and a ring-like shaped stator 9. The rotor 8 comprises respective rotor permanent magnets 10 (cf. FIG. 7, 8 for instance), the stator 9 comprises respective stator coils 17 (cf. FIG. 7, 8 for instance). An air-gap 19 extends between the rotor 8 and the stator 9 (cf. FIG. 7, 8 for instance).

The rotor 8 comprises disc-like shaped rotor end plates 11 supporting the rotor 8 on and relative to an axially extending stator shaft 12. As is particularly discernible from FIG. 3 in association with FIG. 6, the front rotor end plate 11a particularly extends tilted relative to the centre axis A (rotational axis) of the generator 2. Further, a hub interface 13 is provided which hub interface 13 serves to build a direct mechanical connection of the rotor 8 and a rotor hub 3 of a wind turbine 1.

Figure 4:
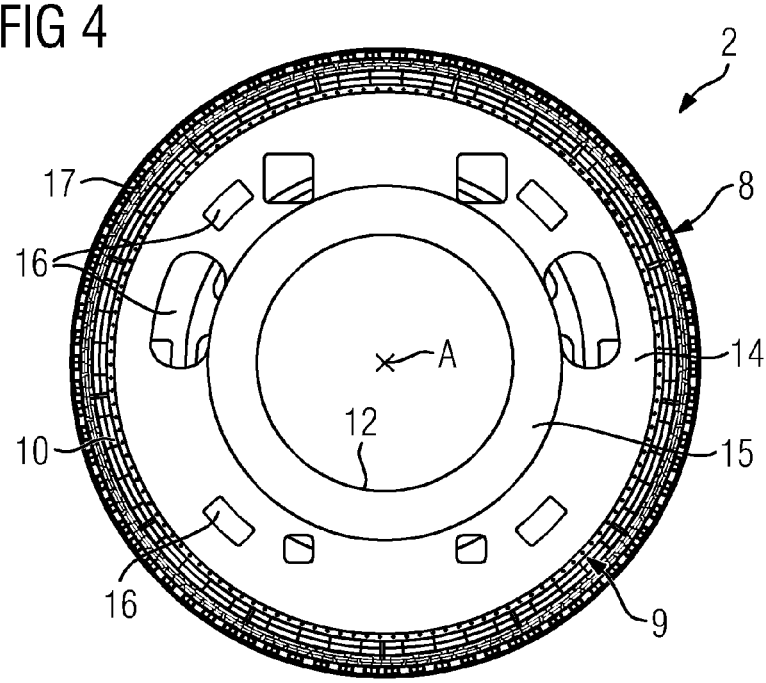
FIG. 4 shows an axial view at the back side of a generator according to an exemplary embodiment.
Figure 5:
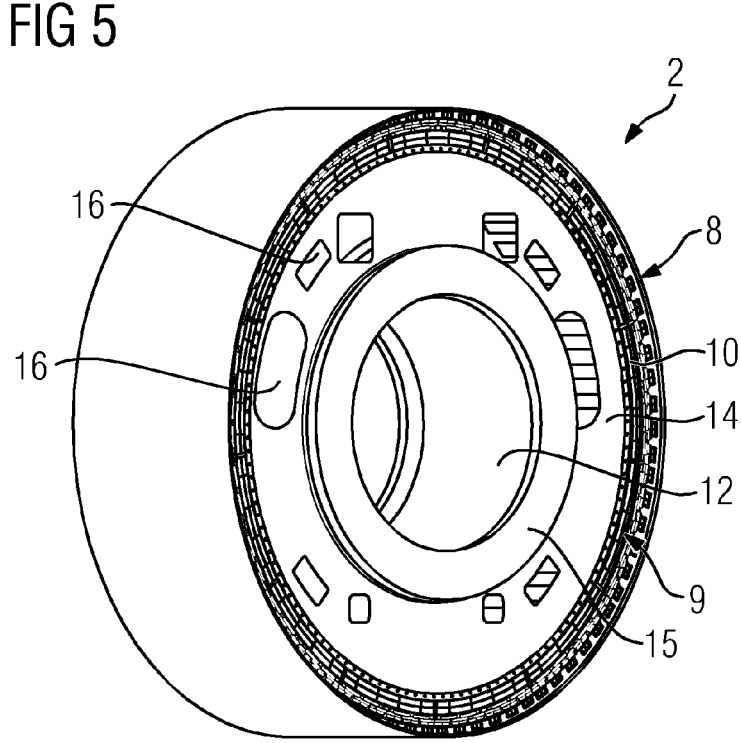
FIG. 5 shows a perspective view of the generator of FIG. 4.

FIG. 4 shows an axial view at the back side of a generator 2 according to an exemplary embodiment. The back side of the generator 2 refers to the face side of the generator 2 which is oriented towards the non-drive end 7 of a wind turbine 1 (cf. FIG. 1). FIG. 5 shows a perspective view of the generator 2 of FIG. 4.

The stator 9 comprises respective disc-like shaped stator end plates 14 supporting the stator 9 on the stator shaft 12. The stator 9 further comprises a wind turbine construction interface 15 serving to provide a mechanical connection of the stator 9 with the construction of the wind turbine 1.

The stator end plate 14 is provided with diverse apertures 16 allowing maintenance and/or service personal to enter into the inside of the generator 2. Further, respective apertures 16 serve in terms of venting holes, i.e. allow the circulation of a gaseous cooling medium within the generator 2. Therefore, respective fans mounted between the stator coils 17, stator end plates 14 and stator shaft 12 are provided (not explicitly depicted).

FIG. 4, 5 further depict respective rotor permanent magnets 10 and stator coils 17 (stator windings). The stator 9 may be segmented in circumferentially extending ring-segment-like shaped stator segments (not explicitly shown) adapted to build the stator 9 when assembled. Since the rotor 8 surrounds the stator 9, the generator 2 has an outer rotor 8-inner stator 9 configuration.

Figure 6:
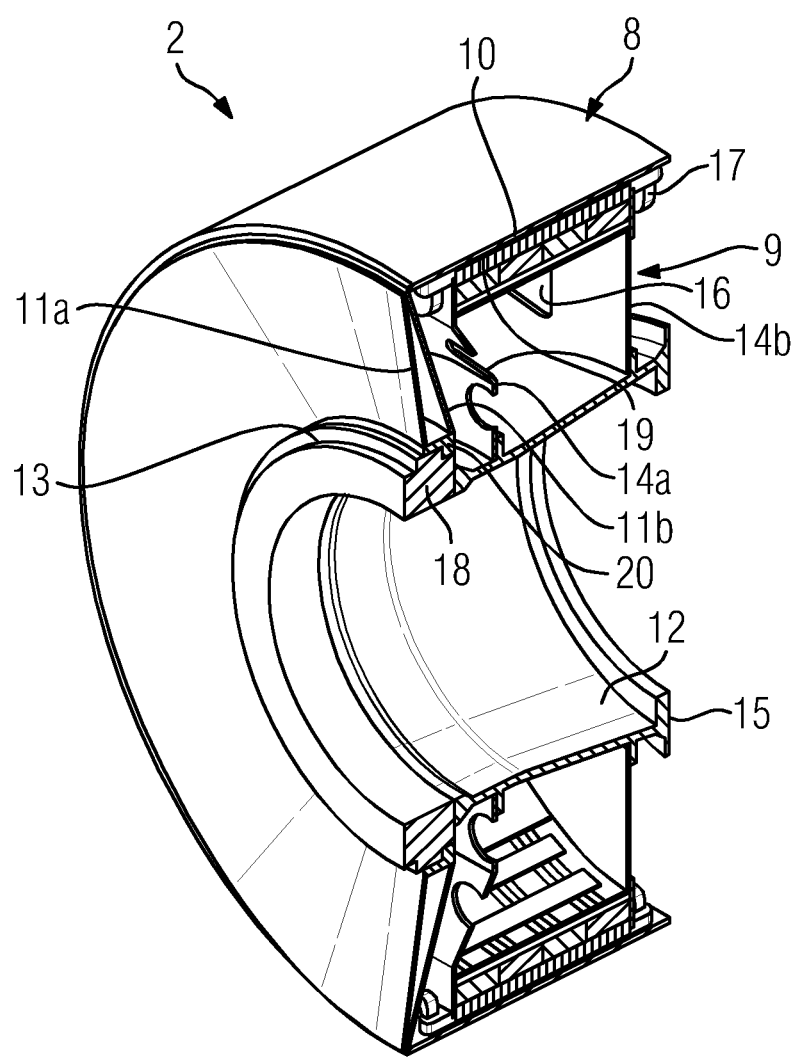
FIG. 6 shows a perspective, partially cut view through a generator according to an exemplary embodiment.
Figure 7:
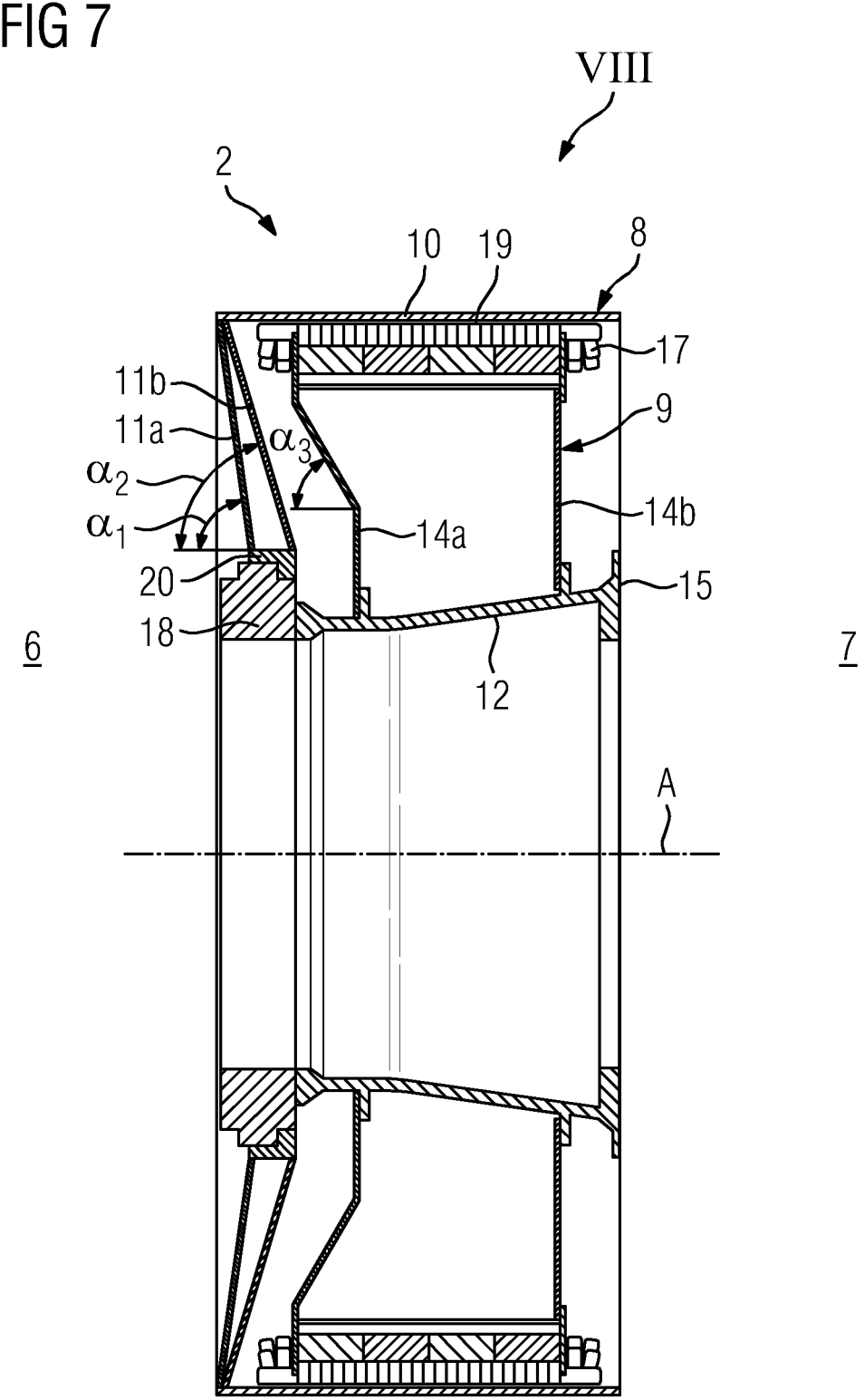
FIG. 7 shows a longitudinally cut view of the generator of FIG. 6.
Figure 8:
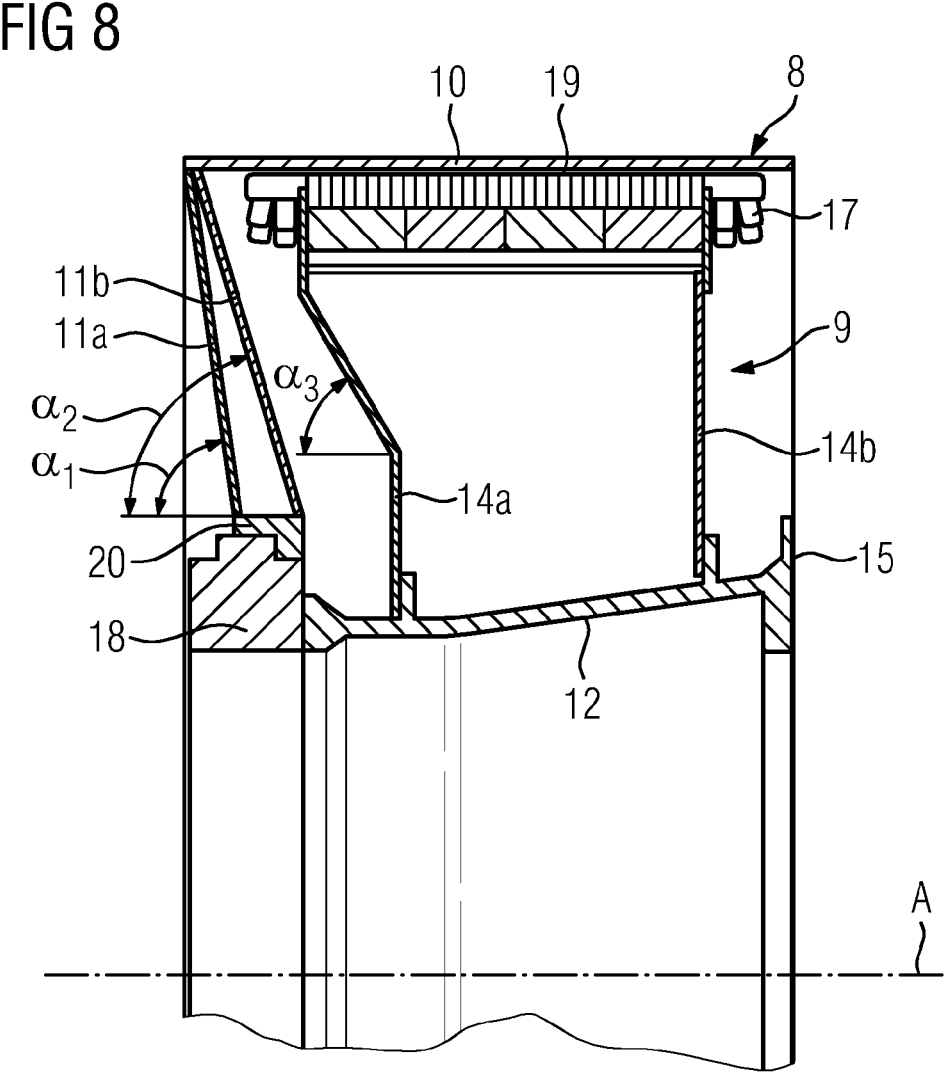
FIG. 8 shows the detail of FIG. 7 in an enlarged view.

FIG. 6 shows a perspective partially cut view through a generator 2 according to an exemplary embodiment. FIG. 7 shows a longitudinally cut view of the generator 2 of FIG. 6. FIG. 8 shows the detail of FIG. 7 in an enlarged view.

Regarding the rotor 8, two axially adjacently disposed rotor end plates 11a, 11b extend tilted relative to the centre axis A of the generator 2, whereby the rotor end plates 11a, 11b are tilted off the axial face side of the rotor 8 in an outward direction emanating from the centre axis A of the generator 2. The two rotor end plates 11a, 11b are disposed at the same axial face side of the rotor 9, i.e. the face side which is to be oriented towards the drive end 6 of a wind turbine 1. The radial inner ends of the respective rotor end plates 11a, 11b are disposed on the rotatable part of a bearing means 18, or a respective base ring 20 mounted to the bearing means 18 which bearing means 18 is axially connected to the stator shaft 12.

The radially outer ends of the respective rotor end plates 11a, 11b converge in a common point at the face side of the rotor 8 facing the drive end 6 of a wind turbine 1. Thus, the rotor end plates 11a, 11b do not extend in parallel due to different tilting angles α1, α2 relative to the centre axis A of the generator 2 or a respective vertical axis, respectively.

Regarding the stator 9, the stator end plate 14a (front plate) oriented towards the drive-end 6 of a wind turbine 1 is partially tilted off the axial face side of the stator 9 in an outward direction emanating from the centre axis A of the generator 2. The stator end plate 14a comprises a first section perpendicularly extending relative to the centre axis A of the generator 2 and a second section extending tilted relative to the first section and to the centre axis A of the generator 2, respectively. As is discernible from FIG. 6, 7, 8, the first section extends from the stator shaft 12, the second section essentially follows the first section in radial direction.

The stator end plate 14b which is oriented towards the non-drive end 7 of a wind turbine 1 is not tilted, but extends perpendicularly relative to the centre axis A of the generator 2. The tilting angle α3 of the second section of the stator end plate 14a differs from the respective tilting angles α1, α2 of the rotor end plates 11a, 11b.

The provision of respective rotor end plates 11, 11a, 11b and stator end plates 14a being at least partially tilted relative to the centre axis A of the generator 2 allows a generator design with a large depth while maintaining the stator shaft 12 comparatively short in axial direction. This principle allows axially large generator dimensions in the region of the stator coils 17 and rotor permanent magnets 10 while keeping the weight of the generator 2 low. The provision of respective at least partially conically shaped, tiltedly extending rotor end plates 11, 11a, 11b and stator end plates 14a offers high stability against mechanical loads introduced in the direction of the centre axis A of the generator 2. Aside, the centre of mass may be located closer to the tower construction of a wind turbine 1.

Although an embodiment has been described in detail, other embodiments are not limited by the disclosed examples from which the skilled person is able to derive other variations.

We claim:

1. A generator, comprising:
a rotor comprising at least two disc-like shaped rotor end plates supporting the rotor, wherein two of the at least two rotor end plates are axially adjacently disposed and each are at least partially extending tilted relative to a centre axis of the generator, whereby the rotor end plates are disposed at one axial face side of the rotor, wherein each rotor end plate comprises a radially outer end; and
a stator comprising at least one disc-like shaped stator end plate supporting the stator, wherein each stator end plate comprises a radially outer end,
wherein the at least two of the at least two rotor end plates axially adjacently disposed and at least one stator end plate at least partially extends tilted relative to the centre axis of the generator in an outward direction towards a drive end,
wherein all of the radially outer ends of the respective rotor end plates converge in a common point at the axial face side of the rotor.

2. The generator according to claim 1, wherein one stator end plate is disposed at each axial face side of the stator, whereby respective stator end plates at least partially extend tilted relative to the centre axis of the generator only at one axial face side of the stator.

3. The generator according to claim 1, wherein at least one stator end plate is disposed at each axial face side of the stator, whereby at least one of the respective stator end plates at least partially extend tilted relative to the centre axis of the generator at one axial face side of the stator.

4. The generator according to claim 1, wherein at least one rotor end plate is disposed at each axial face side of the rotor, whereby respective rotor end plates at least partially extend tilted relative to the centre axis of the generator only at one axial face side of the rotor.

5. The generator according to claim 1, wherein at least one rotor end plate is disposed at each axial face side of the rotor, whereby at least one rotor end plate at least partially extend tilted relative to the centre axis of the generator at one axial face side of the rotor.

6. The generator according to claim 1, wherein a first tilting angle a1, a2 of the respective rotor end plates and a second tilting angle 3 of the respective at least one stator end plate are different.

7. The generator according to claim 1, wherein, if both the rotor end plate and the stator end plate at least partially extend tilted relative to the center axis of the generator, the respective rotor and at least one stator end plates are disposed at the same axial face side of the generator.

8. The generator according to claim 1, wherein a first tilting angle of the respective rotor end plate and a second tilting angle of the respective stator end plate are different.

9. The generator according to claim 1, wherein, if the stator end plate partially extends tilted relative to the centre axis of the generator, the respective stator end plate comprises a first section perpendicularly extending relative to the center axis of the generator and a second section extending tilted relative to the center axis of the generator.

10. The generator according to claim 1, wherein a tilting angle of respective tilted sections of a rotor end plate and/or stator end plate lies in the range of 1-700 in anti-clockwise or clockwise direction emanating from a vertical axis.

11. The generator according to claim 1, wherein at least one stator end plate comprises at least one aperture.

12. A wind turbine, comprising:
   at least one generator according claim 1,
   wherein a first face side of the generator is oriented towards a drive-end of the wind turbine and second face side of the generator is oriented towards a non-drive end of the wind turbine.

\* \* \* \* \*